United States Patent
Ikeda et al.

(10) Patent No.: US 6,513,877 B1
(45) Date of Patent: Feb. 4, 2003

(54) ARMREST FOR VEHICLE SEAT AND METHOD OF FORMING THE SAME

(75) Inventors: Tetsuo Ikeda, Akishima (JP); Takashi Kato, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 64 days.

(21) Appl. No.: 09/702,043

(22) Filed: Oct. 30, 2000

(51) Int. Cl.[7] .................................................. B60N 2/46
(52) U.S. Cl. ............................ 297/411.33; 297/411.37; 297/411.38; 264/46.6; 264/46.7
(58) Field of Search ................... 297/411.38, 411.32, 297/452.18, 411.33, 452.38, DIG. 1, DIG. 2, 411.3, 411.31, 411.34, 411.37, 411.2; 264/46.5, 46.6, 46.7

(56) References Cited

U.S. PATENT DOCUMENTS

| | | | |
|---|---|---|---|
| 5,106,160 A | * | 4/1992 | Nomura et al. |
| 5,275,779 A | * | 1/1994 | Marfilius et al. |
| 5,409,297 A | * | 4/1995 | De Filippo |
| 5,611,977 A | | 3/1997 | Takei |
| 5,855,831 A | * | 1/1999 | Takei |
| 5,967,612 A | * | 10/1999 | Takei |
| 6,073,996 A | * | 6/2000 | Hatsuta et al. |

* cited by examiner

Primary Examiner—Milton Nelson, Jr.
(74) Attorney, Agent, or Firm—Browdy and Neimark

(57) ABSTRACT

An armrest for vehicle seat is provided, whose armrest body has a region so configured as to surround a connecting portion by which the armrest is rotatably connected with a seat back of the seat, wherein a cubic trim cover assembly of the armrest is formed with a local side defined on and along such region of armrest body. Formed in such local side of trim cover assembly is an injection hole for allowing injection of a liquid foaming material into the inside of trim cover assembly, so that the injection hole itself is not exposed outwardly of the armrest body, thus keeping the user away from contact with an objectionable spot originating from a part of liquid foaming material that has been leaked through the injection hole and cured there during a foaming process. The connecting portion may include a tubular bearing, and the injection hole may be formed at any point in that particular local side for coaxial alignment with the tubular bearing, during the foaming process, so that an injection nozzle may be introduced through the tubular bearing precisely into the injection hole.

5 Claims, 4 Drawing Sheets

ARMREST FOR VEHICLE SEAT AND METHOD OF FORMING THE SAME

BACKGROUND OF INVENTION

1. Field of the invention

The present invention relates to an armrest for use on a vehicle seat and a method for forming the same. In particular, the invention is directed to a foamed armrest having a foam padding in its trim cover assembly, and also directed to a method for forming such kind of armrest under the steps of injecting and curing a liquid foaming blase material in a three-dimensional trim cover assembly preformed by sewing in a predetermined shape of armrest.

2. Description of Prior Art

In general, an armrest for use with a vehicle seat is mounted on a support shaft projected outwardly from a lateral side of seat back and rotatable about the shaft in a vertical direction. The armrest, therefore, may be selectively located in one of a horizontal use position and an upright non-use position, so that a passenger can rest his or her arm thereon at the horizontal use position, or can move the armrest to the upright non-use position set along the vertical line of seat back.

The ordinary formation of this kind of armrest is by sewing together plural trim cover materials into a predetermined cubic body of trim cover assembly, followed by injecting and curing a liquid foaming material in that cubic trim cover assembly to create a foam padding integrally therein. This process normally uses an injection nozzle to inject the liquid foaming material into the inside of the trim cover assembly. Namely, the injection nozzle is inserted in a given injection hole formed in the trim cover assembly and then the liquid foaming material is forced through the nozzle thereinto, after which, the liquid foaming material is cured to fill a mass of foam padding within the trim cover assembly.

Hitherto, the armrests thus formed have encountered such problem that an objectionable residual cured spot of the liquid foaming material remains at and around the injection hole in the trim cover assembly since a part of the liquid foaming material has been leaked outwardly through that hole during the foaming process and cured there into such objectionable spot. Because, as stated above, the armrest itself is rotated vertically, all walls of its body are to be exposed outwardly. This allows the objectionable cured spot to be viewed from the outside, impairing the outer aesthetic appearance of armrest, and also causes an unpleasant touch to a user whose arm contacts the wall part of armrest where the cured spot in question lies.

Moreover, at the step of injecting a liquid foaming material into the armrest trim cover assembly, it has been a common practice for a worker to use an injection nozzle fixed on a working table, while placing the trim cover assembly on the same table, and manually have the nozzle inserted into the injection hole of trim cover assembly. Such conventional steps have posed a difficulty in retaining an optimum position of the injection nozzle relative to the injection hole of trim cover assembly and caused the trouble that the liquid foaming material is not evenly filled in the trim over assembly, thus resulting in an incomplete creation of foam padding therein.

SUMMARY OF THE INVENTION

In view of the above-stated drawbacks, it is therefore a primary purpose of the present invention to provide an improved armrest for vehicle seat which not only insures a good cushiony touch on its all exposed walls, but also keeps an aesthetic appearance of the armrest.

To achieve such purpose, an armrest in accordance with the present invention is basically comprised of:
 a connecting means provided between the armrest and a seat back, by way of which connecting means, the armrest is rotatably connected to the seat back;
 an armrest body having a region so configured as to surround a part of the connecting means;
 wherein the armrest body consists essentially of: a three-dimensional trim cover assembly having a local side defined on and along such region of the armrest body; a framework; and a foam padding, wherein the foam padding is filled in the trim cover assembly integrally together with the framework; and
 an injection hole formed in the aforesaid local side of the trim cover assembly, which injection hole is adapted to allow an injection nozzle to be inserted therethrough into an inside of the trim cover assembly during a foaming process, so that a liquid foaming material is injected thereinto via the injection nozzle to create the foam padding.

In one aspect of the invention, the foregoing connecting means includes a tubular bearing disposed in the foregoing region of armrest body, in which tubular bearing, a support rod means is rotatably received for allowing the armrest body to be rotatable in a vertical direction, and the injection hole may be formed at any point in the local side of trim cover assembly such as to be in a coaxial alignment with the tubular bearing, so that, during the foaming process, the injection nozzle may be introduced through the tubular bearing into the injection hole, prior to mounting the support rod means rotatably in the tubular bearing.

Accordingly, the injection hole can be formed in such region of the three-dimensional trim cover assembly where the hole itself is invisible from the outside and kept away from contact with a user. Thus, any objectionable cured spot at the injection hole is concealed, which originates from a part of liquid foaming material that has been leaked through the hole and cured there during the foaming process. This effectively keeps aesthetic, the outer appearance of armrest, and insures to avoid any unpleasant hard touch of the spot to a user's arm and other body portion.

It is a second purpose of the present invention to provide a method for forming the above-described armrest.

For that purpose, in accordance with the present invention, there is basically provided the steps of:
 forming the injection hole at any point in the local side of cover assembly such as to set the injection hole in a coaxial alignment with the tubular bearing;
 inserting the injection nozzle through the tubular bearing into the injection hole;
 causing the liquid foaming material to flow through the injection nozzle and hole into an inside of the trim cover assembly;
 then, curing the liquid foaming material into a foam padding filled in the trim cover assembly;
 removing the injection nozzle from both tubular bearing and injection hole; and
 inserting and rotatably securing the support shaft in the tubular bearing to thereby rotatably connect said armrest body to the seat back.

Accordingly, the tubular bearing is utilized as a guide through which the injection nozzle can be precisely introduced toward the injection hole. A worker can therefore conduct a stable positioning of the injection nozzle relative to the trim covert assembly, which assures to stabilize a flow of liquid foaming material via the nozzle and injection hole into the trim cover assembly, thereby creating a uniform resultant foam padding therein with its unchanged quality.

Another features and advantages of the present invention will become apparent from the description hereinafter, with reference to the annexed drawings.

DETAILED DESCRIPTION OF PREFERRED EMBODIMENTS OF THE INVENTION

Referring to FIGS. 1 through 7, there are illustrated an armrest for vehicle seat and a method for forming the same in accordance with the present invention. The armrest, generally designated by (A), is of the type including a connecting portion (4) and an armrest body having a recessed region (X) so configured to partly surround the outer sides of such connecting portion (4). Designaton (S) denotes an ordinary vehicle seat which has a seat cushion (SC) and a seat back (SB). As shown, the armrest (A) is attached rotatably via the connecting portion (4) to one lateral wall (B) of the seat back (SB).

Figure 1:
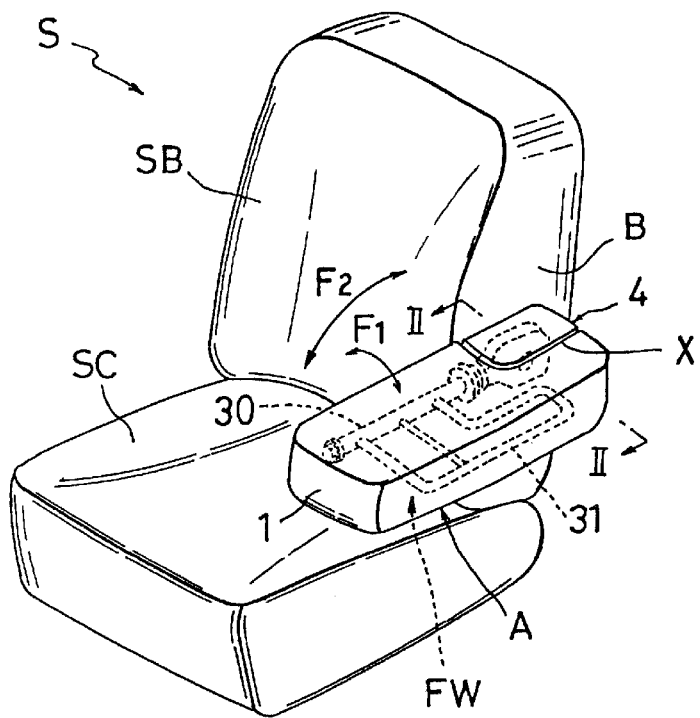
FIG. 1 is a schematic perspective view of a vehicle seat to which an armrest of the present invention is applied.
Figure 2:
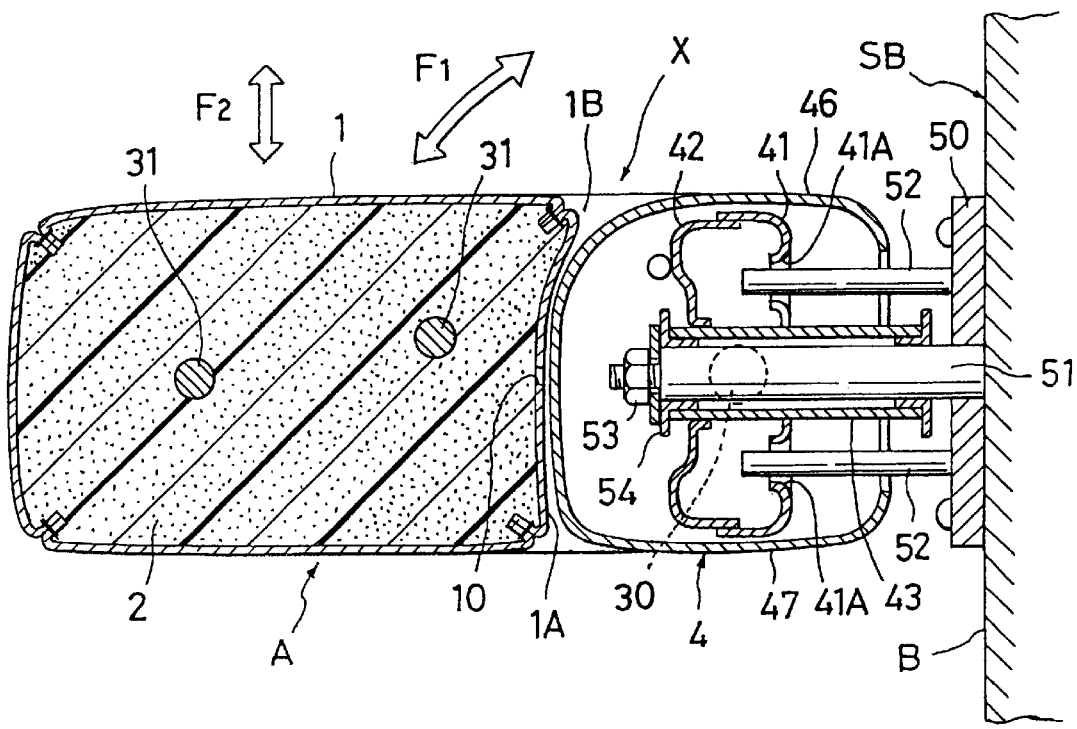
FIG. 2 is a sectional view taken along the line II—II in the FIG. 1.

As understandable from FIGS. 1 and 2, the shown armrest (A) is of such a type that enables a user to rotate the body of armrest in both vertical direction (F2) and lateral (rightward and leftward) directions (F1) with respect tol the connecting portion (4) or the seat (S). For, in brief, the framework (at FW) of armrest (A) includes a first axis of rotation at (43) (51) for allowing vertical rotation (F2) of the armrest and a second axis of rotation at (30) for allowing its lateral rotation (F1) of the same armrest, which will be described later. Hence, for example, a user may wish to rotate the armrest (A) leftwards about the second axis of rotation (at 30) so that the wide workable upper surface of armrest on which the user normally rests his or her arm (as viewed in FIG. 2) is turned by 90 degrees to a side inwardly of the seat (S), to thereby store that workable armrest surface in a non-use position, or may wish to rotate the armrest (A) about the first axis of rotation (at 43, 51) in a direction from a horizontal use position (as in FIG. 1) up to an upright non-use position (not shown) where the armrest lies along the vertical line of the lateral wall (B) of seat back (SB).

Figure 3:
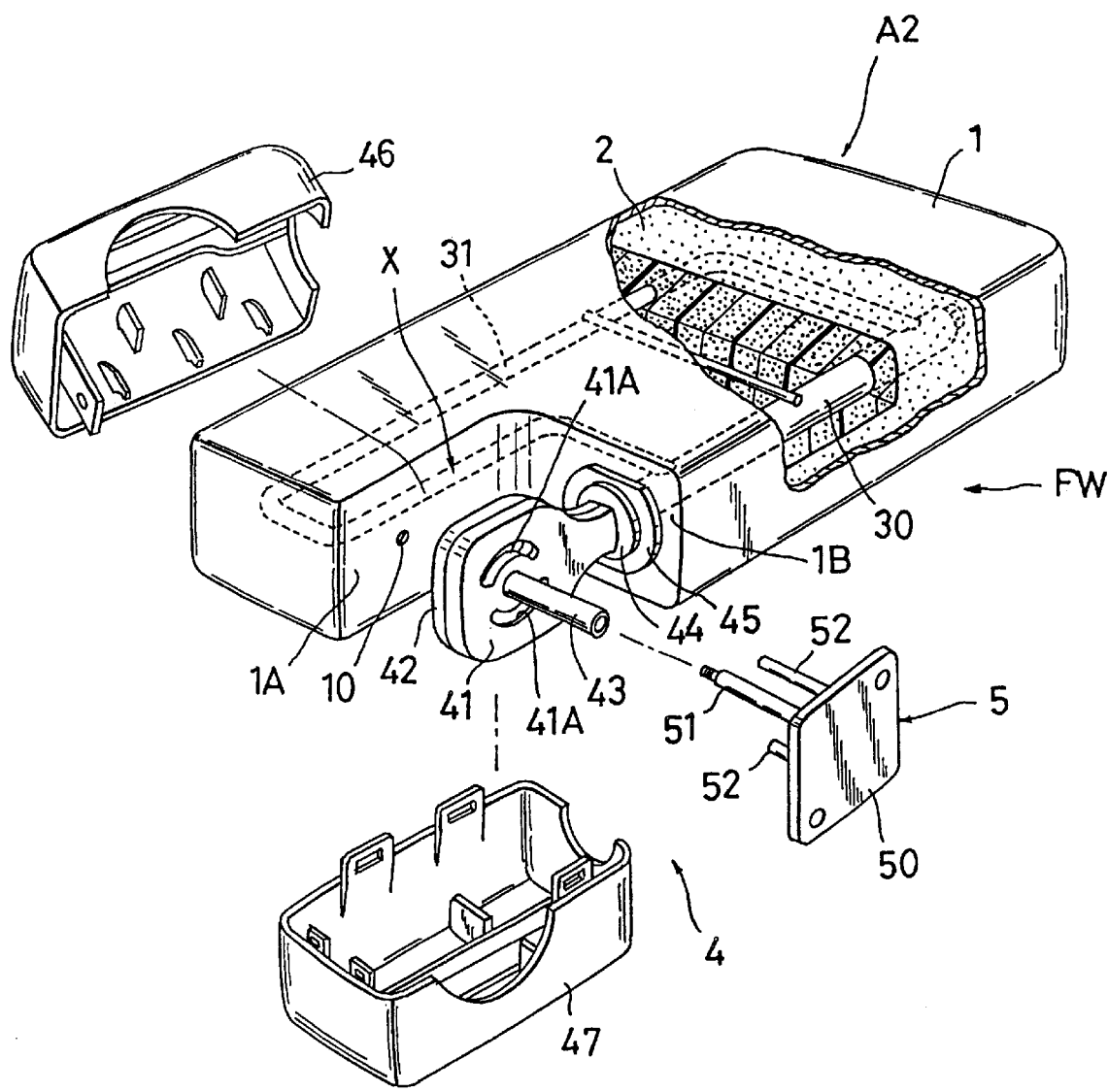
FIG. 3 is a partly broken and exploded perspective view of a resulting complete armrest having a foam padding and framework therein.
Figure 6:
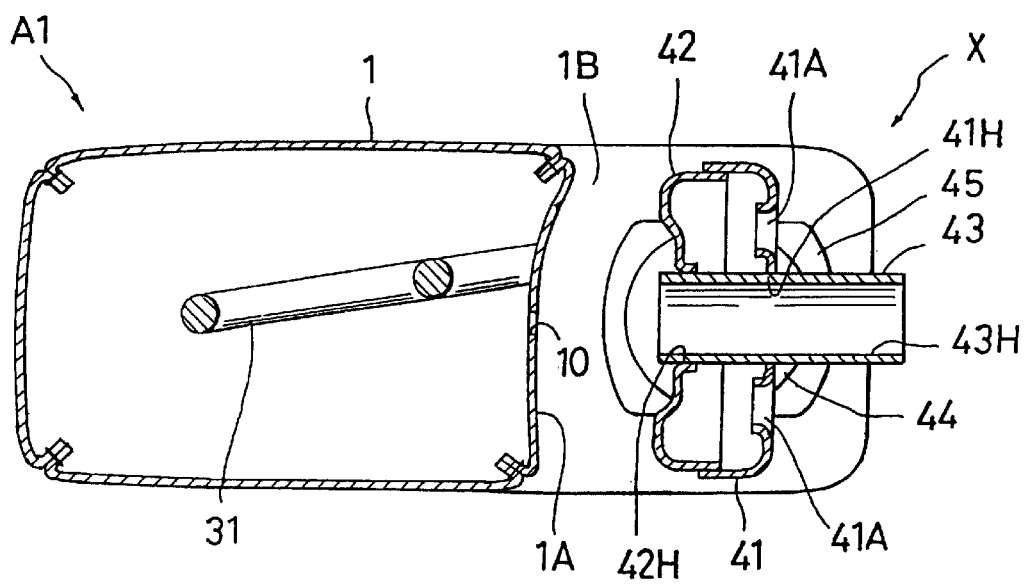
FIG. 6 is a sectional view taken along the line VI—VI in the FIG. 5.

Specifically, as best seen in FIGS. 3, the framework (FW) includes a connecting bracket assembly (41, 42, 43) for rotatably connecting the framework itself to a support base member (5) fixed on the lateral wall (B) of seat back (SB). Such connecting bracket assembly itself forms a part of the above-defined connecting portion (4), comprising a pair of first and second brackets (41) (42) and a tubular bearing (43) extending horizontally from the vertical surface of first bracket (41), as illustrated. The first and second brackets (41) (42) are fixed together to form a main body of connecting bracket assembly, with their respective central holes (41H) (42H) aligned coaxially with each other, as can be seen in FIGS. 2 and 6. In those two holes (41H) (42H), one end portion of the tubular bearing (43) passes and is fixedly connected therewith. As will be explained later, the tubular bearing (43) receives therein a support rod (51) of the base member (5) forming a part of the connecting portion (4) (See FIG. 2), so that the armrest (A) can be rotated about the axis of support rod (51) (i.e. a center or rotation) in the vertical direction (F2). The second bracket (42) has a pair of arcuate grooves (41A) (41A) formed in the outer vertical wall thereof. In the two grooves (41A), as will be explained, a pair of stopper rods (52) associated with the base member (5) are respectively engaged slidably for the purpose of limiting the vertical rotation of the armrest (A). The framework (FW) also includes: a rotary shaft (30) which is integrally connected with both two brackets (41) (42) on the same linear line; and a generally L-shaped support frame member (31) fixed on the rotary shaft (30). The support frame member (31) is shown as extending laterally from a side where the brackets (41, 42) and rotary shaft (30) lies, so as to substantially provide a support plane within the armrest (A). The rotary shaft (30), though not shown, has an inner rotary spindle extending therein in the longitudinal direction thereof, wherein the inner rotary spindle is fixedly connected with the brackets (41) (42) and free to rotate within the longitudinal bore of shaft (30), thus allowing the foregoing rotation of armrest in the lateral directions (F1), as known in the art.

Designations (44) and (45) stand for a retainer piece and sealing plate piece, respectively. While not clearly shown, the retainer piece (44) is so provided in pair as to retain the peripheral end of opening (11) from both sides in order that the framework (FW) is set in position relative to the trim cover assembly (1), in such a manner that the connecting bracket assembly (41, 42, 43) is only exposed outwardly while the rest of framework (FW) is placed within the trim cover assembly (1), as in FIG. 5. The sealing plate piece (45) is disposed inwardly of the retainer piece (44) to cover and seal the whole of opening (11) on the outer side of trim cover assembly (1) against leakage of a liquid foaming material (see 2A in FIG. 7) from that opening (11).

Figure 4:
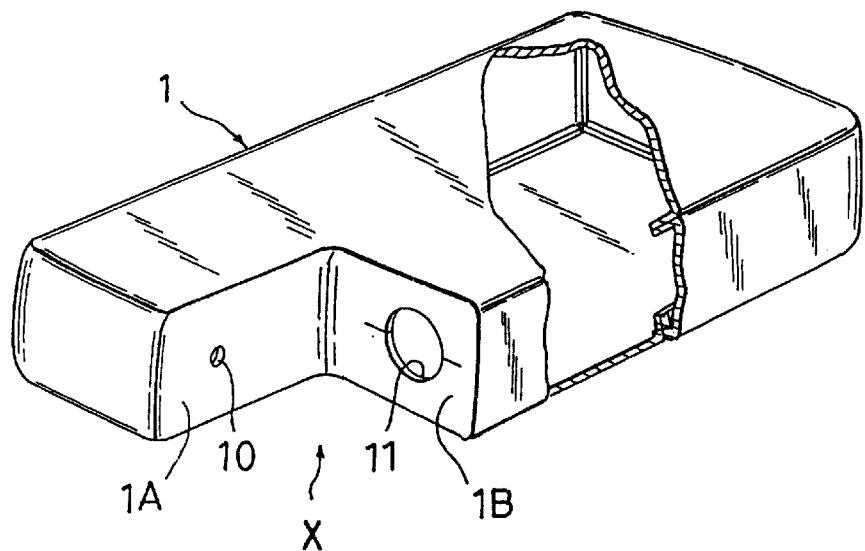
FIG. 4 is a partly broken perspective view of a cubic trim cover assembly of the armrest.

FIG. 4 shows the trim cover assembly (1) used in the present embodiment of invention, which is preformed by sewing together plural separate cover materials (of non-permeable property) into the illustrated cubic or three-dimensional configuration having a generally L-shaped recessed region (X) defined at its one corner portion, so that the whole of the trim cover assembly (1) assumes a generally "L" shape. The recessed region (X) has a first wall (1A) in which an injection hole (10) is formed to allow an injection nozzle to pass therethrough, and a second wall (1B) in which an entry/mounting opening (11) is formed to allow entry and mounting of an armrest frame (3) therethrough into the inside of trim cover assembly (1), as will be explained later.

Description will now be made of a process for assembling and forming the armrest of the present invention.

Figure 5:
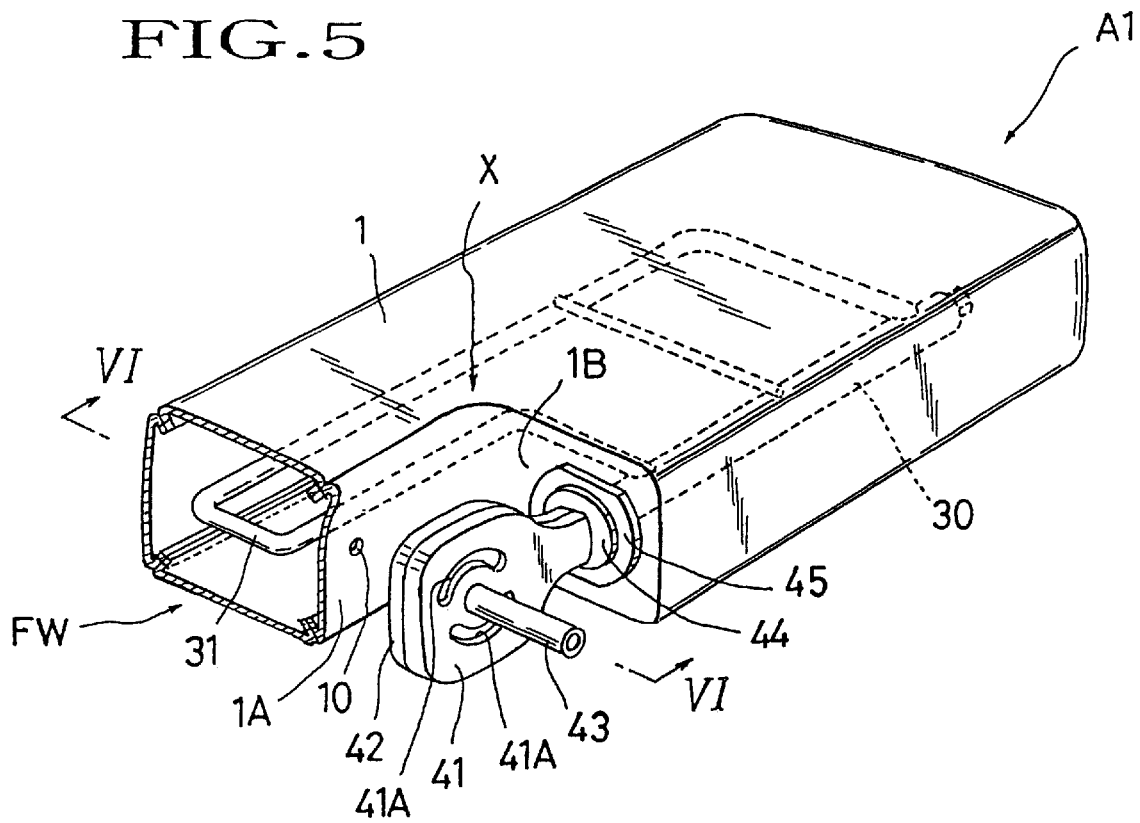
FIG. 5 is a partly broken perspective view of an incomplete armrest unit having only the framework placed in the trim cover assembly.

At first, referring to FIG. 5, the framework (FW) is inserted via the opening (11) into the inner hollow of the trim cover assembly (1) such that only the connecting bracket assembly stated above is exposed outwardly, while both rotary shaft (30) and support frame piece (31) are placed in the generally L-shaped inner hollow of trim cover assembly (1). Then, the peripheral end of opening (11) is retained by the retain piece (44) so as to set the whole frame work (FW) in place, as in FIG. 5, relative to the trim cover assembly (1). Of course, at this point of assemblage, the sealing plate piece (45) is attached on and about the whole of opening (11). With this assembly, it is seen that the first and second brackets (41) (42) are positioned within the recessed region (X) and in particular, the outer vertical lateral wall of the first bracket (41) faces toward the first wall (1A) of recessed region (X). Here, it is important to align the axis of tubular bearing (43) coaxially with the injection hole (10) formed in that particular first wall (1A), as can be seen from the mode of FIG. 6, for a precise nozzle positioning purpose to be set forth below. But, in this regard, it is rather essential that, within the generic scope of the present invention, the injection hole (10) per se be formed in any suitable point in either of the first and second walls (1A) (1B) insofar as the injection hole may be in a coaxial alignment with the axis of tubular bearing (43) that might be disposed in a different angle from that shown in the figures, depending on any other particular construction and design of armrest (A).

Now, in that manner, there is produced an incomplete armrest unit (A1).

Figure 7:
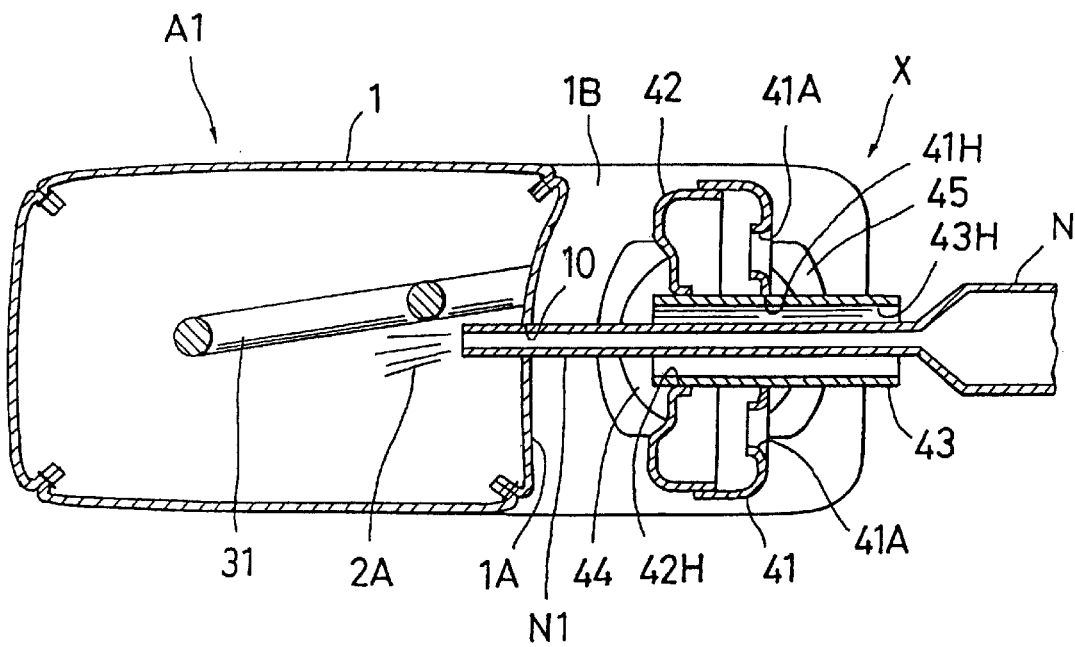
FIG. 7 is a sectional view similar to the FIG. 6, which explanatorily shows the process for injecting a liquid foaming material in order to subject the incomplete armrest unit to a foaming process.

Next, as shown in FIG. 7, the nozzle end portion (Ni) of an injection nozzle (N) is inserted through the inner bore (43H) of tubular bearing (43) until it passes through the injection hole (10) into the inside of trim cover assembly (1). In this respect, it is appreciated that such tubular bearing (43) per se, which inherently receives the support rod (51) therein, is now utilized as an effective guide through which the nozzle portion (N1) can be precisely pointed to the target, i.e. the injection hole (10), and can be smoothly introduced thereto. Hence, a worker can easily and precisely position the nozzle relative to the trim cover assembly (1), while retaining the nozzle stable, which assures to stabilize the flowing of a given amount of liquid foaming material into the trim cover assembly, thereby achieving an unchanged high quality of foaming. Further, there is no need to prepare any separate jig or member to support the nozzle (N), thus not only facilitating the foaming process, but also maintaining a low cost.

Thereafter, a predetermined amount of liquid foaming material (2A) is injected from the nozzle (N) into the inner hollow of trim cover assembly (1), and then a foaming is effected to cure the liquid foaming material (2A) so as to fill an increased mass of foam padding (2) within the whole hollow of trim cover assembly (1). After having removed the nozzle (N) from both injection hole (10) and tubular bearing (43), there is produced such a complete armrest unit (A2) as depicted in FIG. 3, wherein all the trim cover assembly (1), framework (FW) and foam padding (2) are formed together in an integral manner.

Next step is to connect the thus-formed armrest Unit (A1) to the support base member (5) provided on the lateral wall (B) of seat back (SB), as in FIG. 2. This base member (5) has a base plate (50) securely attached to that seat back lateral wall (B). Fixed on the center of this base plate (50) is the support rod (51) that has been described as a center of vertical rotation of the armrest. A pair of stopper rods (52) are fixed on the same base plate (50) such as to be disposed on the opposite sides of the support rod (51). Now, as understandable from FIGS. 2 and 3, the support rod (51) is passed via a bush (54) through the tubular bearing (43) until its threaded end portion projects from the free end of the latter, while causing the two stopper rods (52) to slidably engage in the two respective arcuate guide grooves (41A). Then, a nut (53) is threadedly fixed to the threaded end portion of tubular bearing (43) to complete joining the connecting bracket assembly (41, 42, 43) to the support base member (5) whereupon the armrest body is rotatably connected to the seat back (SB). Due to the slidable engagement of the two stopper rods (42) in the respective two guide grooves (41A), the armrest (A) is limited as to its vertical rotation range, and further, the armrest (A) can be retained still at each of the horizontal use position where it extends horizontally from the seat back (SB) as in FIG. 1 and the upright non-use position where it is stored along the lateral wall (B) of seat back (SB) though not shown.

In this context, it is appreciated that the injection hole (10) is situated at the recessed region (X), i.e. in the wall (1A) thus facing toward the seat back (SB) in the direction inwardly of the armrest (A), which means that an objectionable cured spot of the liquid foaming material (2A), which has been leaked through the injection hole (10) and cured thereabout, is effectively prevented from unpleasant contact with an arm or body portion of user and also concealed against view from the outside.

Finally, a pair of garnish cover half pieces (46) (47), which form a part of the connecting portion (4), are so secured together as to accommodate or house the connecting bracket assembly (41, 42, 43) therein, as can be seen from FIGS. 3 and 2, so that most of the connecting bracket assembly is concealed and not viewed from the outside. The whole dimensions of such complete garnish cover pieces (46, 47) are generally equal to and slightly smaller than a cubic space defined by the recessed region (X) in the armrest (1), so as to avoid interference with the vertical and lateral rotations of the armrest body (A). This attachment of garnish pieces (46) (47), which substantially occupies the recessed region (X), naturally results in concealing the whole walls (1A) (1B) of recessed region (X), whereby the foregoing objectionable spot remaining cured at the injection hole (10) is positively invisible and kept away from contact with a user.

From the descriptions above, it is be appreciated that, the present invention is endowed with following advantages:

(I) An injection hole (such as the hole (10)) is formed in such a region of the three-dimensional trim cover assembly (1) as the recessed region (X) where the hole itself is invisible from the outside and kept away from contact with a user. Thus, any objectionable cured spot at the injection hole is concealed, which originates from a part of liquid foaming material that has been leaked through the hole and cured there during the foaming process. This effectively keeps aesthetic the outer appearance of armrest, and insures to avoid any unpleasant hard touch of the spot to a user's arm and other body portion.

(II) In the process of forming the armrest, it is structurally possible for the tubular bearing (43) to be aligned coaxially with the aforesaid injection hole within the recessed region (X), so that the bearing (43) is utilized as a guide through which an injection nozzle (N) can be precisely introduced toward the injection hole. Accordingly, a worker can conduct a stable positioning of the injection nozzle relative to the trim cover assembly, which assures to stabilize a flow of liquid foaming material via the nozzle and injection hole into the trim cover assembly, thereby creating a uniform resultant foam padding therein with its unchanged quality. Further, there is no need to prepare any separate jig or member to support the nozzle, thus not only facilitating the foaming process, but also maintaining a low cost.

(III) The present invention is particularly effective for use in the illustrated type of armrest (A) which can be rotated in both of the vertical and lateral directions, because all the walls of such armrest can be exposed outwardly, making it highly possible for the foregoing objectionable spot at the injection hole to be visible and contacted with the user's arm.

While having described the present invention so far, it should be understood that the invention is not limited to the illustrated embodiment, but any other modifications, replacements and additions may be applied structurally and methodologically thereto without departing from the scopes of the appended claims.

What is claimed is:

1. An armrest in combination with a vehicle seat including a seat back, comprising:

a connecting means provided between said armrest and said seat back, by way of which connecting means, the armrest is rotatably connected to the seat back;

an armrest body having a recessed region so configured as to surround a part of said connecting means, said armrest body having a corner portion, wherein said recessed region is so formed in said corner portion as to have, defined therein, at least two inward walls which surround said part of said connecting means, said armrest body consisting essentially of: a three-dimensional trim cover assembly having a local side defined on and along said at least two inward walls of said recessed region; a framework; and a foam padding, wherein the foam padding is filled in the trim cover assembly integrally together with said framework; and an injection hole formed in said local side of said three-dimensional trim cover assembly, said injection hole being adapted to allow an injection nozzle to be inserted therethrough into an inside of the trim cover assembly during a foaming process, so that a liquid foaming material is injected thereinto via the injection nozzle to create said foam padding.

2. The armrest according to claim 1, wherein said connecting means includes a bracket means connected with said framework, wherein said bracket means is exposed in said recessed region of said armrest body and so rotatably connected with said seat back as to allow said armrest body to be rotatable vertically relative to said vehicle seat, wherein said framework includes a rotary shaft means for allowing said armrest body to be rotatable laterally relative to the vehicle seat, and wherein said connecting means further includes a garnish cover means for housing said bracket means therein, said garnish cover means substantially occupying said recessed region of said armrest body.

3. The armrest according to claim 1, wherein a support rod means is fixed on said seat back, wherein said connecting means includes a tubular bearing disposed in said recessed region of said armrest body, in which tubular bearing, said support rod means is rotatably received for allowing said armrest body to be rotatable in a vertical direction relative to said vehicle seat, and wherein said injection hole is formed at any point in said local side of the three-dimensional trim cover assembly so as to set the injection hole in a coaxial alignment with said tubular bearing, so that, during said foaming process, said injection nozzle may be introduced through said tubular bearing into the injection hole, prior to mounting said support rod means rotatably in said tubular bearing.

4. A method for forming an armrest according to claim 1, wherein said connecting means includes a tubular bearing disposed in said recessed region of said armrest body, in which tubular bearing, a support rod means fixed on said seat back is to be rotatably received to allow said armrest body to rotate about the support shaft, and wherein the method comprises the steps of:

forming said injection hole at any point in said local side of said three-dimensional trim cover assembly so as to set the injection hole in a coaxial alignment with said tubular bearing;

inserting said injection nozzle through said tubular bearing into said injection hole;

causing said liquid foaming material to flow through said injection nozzle and hole into an inside of said three-dimensional trim cover assembly;

then, curing said liquid foaming material into a foam padding filled in the trim cover assembly;

removing said injection nozzle from both said tubular bearing and injection hole; and inserting and rotatably securing said support shaft in said tubular bearing to thereby rotatably connect said armrest body to said seat back.

5. The method according to claim 4, wherein said connecting means further includes a garnish cover means for housing said connecting means therein, said garnish cover means being of a dimension substantially occupying said recessed region of said armrest body, and wherein the method further includes the step of attaching said garnish cover means around said connecting means in said recessed region of said armrest body subsequent to the step of inserting and rotatably securing said support shaft in said tubular bearing.

* * * * *